(12) United States Patent
Huotari et al.

(10) Patent No.: US 9,682,262 B2
(45) Date of Patent: Jun. 20, 2017

(54) WATER MIST FIRE SUPPRESSION SPRINKLER

(71) Applicant: MARIOFF CORPORATION OY, Vantaa (FI)

(72) Inventors: Arto Huotari, Helsinki (FI); Harri Mattila, Hyvinkää (FI); Jarkko Malinen, Jarvenpaa (FI); Michael Kenneth Krager, Whitinsville, MA (US); Aino Oikari, Helsinki (FI); Andre Jochim, Espoo (FI)

(73) Assignees: MARIOFF CORPORATION OY, Vantaa (FI); KIDDE-FENWAL INCORPORATED, Ashland, MA (US)

( * ) Notice: Subject to any disclaimer, the term of this patent is extended or adjusted under 35 U.S.C. 154(b) by 0 days.

(21) Appl. No.: 14/370,387

(22) PCT Filed: Mar. 1, 2013

(86) PCT No.: PCT/FI2013/050288
§ 371 (c)(1),
(2) Date: Jul. 2, 2014

(87) PCT Pub. No.: WO2013/132152
PCT Pub. Date: Sep. 12, 2013

(65) Prior Publication Data
US 2014/0367125 A1 Dec. 18, 2014

Related U.S. Application Data

(60) Provisional application No. 61/606,555, filed on Mar. 5, 2012.

(51) Int. Cl.
*A62C 37/00* (2006.01)
*A62C 35/68* (2006.01)
(Continued)

(52) U.S. Cl.
CPC .............. *A62C 35/68* (2013.01); *A62C 35/60* (2013.01); *A62C 37/00* (2013.01); *A62C 37/14* (2013.01);
(Continued)

(58) Field of Classification Search
CPC ......... A62C 37/14; A62C 37/11; A62C 37/08; A62C 35/60
(Continued)

(56) References Cited

U.S. PATENT DOCUMENTS

| 278,219 A | 5/1883 | Brown |
|---|---|---|
| 280,009 A | 6/1883 | Birkett |

(Continued)

FOREIGN PATENT DOCUMENTS

| EP | 0033062 A1 | 8/1981 |
|---|---|---|
| EP | 1944066 A2 | 7/2008 |

(Continued)

OTHER PUBLICATIONS

Notification of Transmittal of the International Search Report and the Written Opinion of the International Searching Authority, or the Declaration; PCT/FI2013/050228; Feb. 11, 2014, 9 Pages.

*Primary Examiner* — Arthur O Hall
*Assistant Examiner* — Viet Le
(74) *Attorney, Agent, or Firm* — Cantor Colburn LLP

(57) ABSTRACT

A water seat is provided for use in a fire suppression sprinkler. The water seat is movable between an inactive position and an active position. The water seat includes a generally polygonal guiding surface in limited contact with the sprinkler. The water seat is slidable relative to the sprinkler when corrosion residue is present within the sprinkler. A sealing surface is positioned adjacent the polygonal guiding surface and forms a line contact seal at an interface with the sprinkler when the water seat is in an active (Continued)

position. The water seat also includes a guiding portion adjacent the sealing surface and opposite the polygonal guiding surface. The combination of the guiding surface and the guiding portion maintain a generally parallel orientation of the water seat relative to the sprinkler when the water seat moves from an inactive position to an active position.

17 Claims, 3 Drawing Sheets

(51) Int. Cl.
*A62C 37/14* (2006.01)
*A62C 35/60* (2006.01)
*F16K 25/00* (2006.01)

(52) U.S. Cl.
CPC ....... *F16K 25/005* (2013.01); *Y10T 29/49826* (2015.01)

(58) Field of Classification Search
USPC .................................................. 169/37–41
See application file for complete search history.

(56) References Cited

U.S. PATENT DOCUMENTS

| | | | |
|---|---|---|---|
| 974,176 A | 11/1910 | Newman | |
| 1,351,906 A | 9/1920 | Heeter | |
| 1,997,404 A | 5/1931 | Hamilton | |
| 1,905,676 A | 4/1933 | Barclay | |
| 2,812,979 A | 12/1954 | Ziesche | |
| 2,975,982 A * | 3/1961 | Dahl | F02M 61/08 239/453 |
| 3,178,119 A | 4/1965 | Thorson | |
| 3,198,258 A | 8/1965 | Werner | |
| 3,309,028 A | 3/1967 | Zieg | |
| 3,684,194 A | 8/1972 | Wayne | |
| 3,771,606 A | 11/1973 | James | |
| 3,952,771 A | 4/1976 | Lang | |
| 4,099,573 A | 7/1978 | Sahara | |
| 4,434,855 A | 3/1984 | Given, Jr. | |
| 4,590,999 A | 5/1986 | Snaper | |
| 5,303,778 A | 4/1994 | Vari | |
| 5,415,239 A | 5/1995 | Kotter et al. | |
| 5,513,708 A | 5/1996 | Sundholm | |
| 5,533,576 A | 7/1996 | Mears | |
| 5,573,065 A | 11/1996 | Sundholm | |
| 5,655,608 A | 8/1997 | Sundholm | |
| 5,944,113 A * | 8/1999 | Sundholm | 169/37 |
| 5,967,237 A | 10/1999 | Sundholm | |
| 5,967,239 A | 10/1999 | Sprakel et al. | |
| 6,024,175 A | 2/2000 | Moore, Jr. et al. | |
| 6,068,205 A | 5/2000 | Vari | |
| 6,230,815 B1 | 5/2001 | Sundholm | |
| 6,279,663 B1 | 8/2001 | Sundholm | |
| 6,283,387 B1 * | 9/2001 | Palestrant | 239/464 |
| 6,318,474 B1 | 11/2001 | Sundholm | |
| 6,536,534 B1 | 3/2003 | Sundholm | |
| 6,644,269 B2 * | 11/2003 | Kato et al. | 123/305 |
| 6,976,544 B2 | 12/2005 | Sundholm | |
| 7,185,829 B2 | 3/2007 | Sundholm | |
| 7,395,868 B2 | 7/2008 | Sundholm et al. | |
| 7,845,425 B2 | 12/2010 | Flynn | |
| 2006/0237199 A1 | 10/2006 | Sundholm et al. | |
| 2009/0166047 A1 | 7/2009 | Sundholm et al. | |
| 2010/0025051 A1 | 2/2010 | Kristensen | |
| 2010/0326677 A1 | 12/2010 | Jepsen et al. | |
| 2011/0108291 A1 | 5/2011 | Han | |

FOREIGN PATENT DOCUMENTS

| | | |
|---|---|---|
| GB | 2357431 A | 6/2001 |
| JP | H11104263 A | 4/1990 |
| WO | 2007042036 A1 | 4/2007 |
| WO | 2007051897 | 5/2007 |

\* cited by examiner

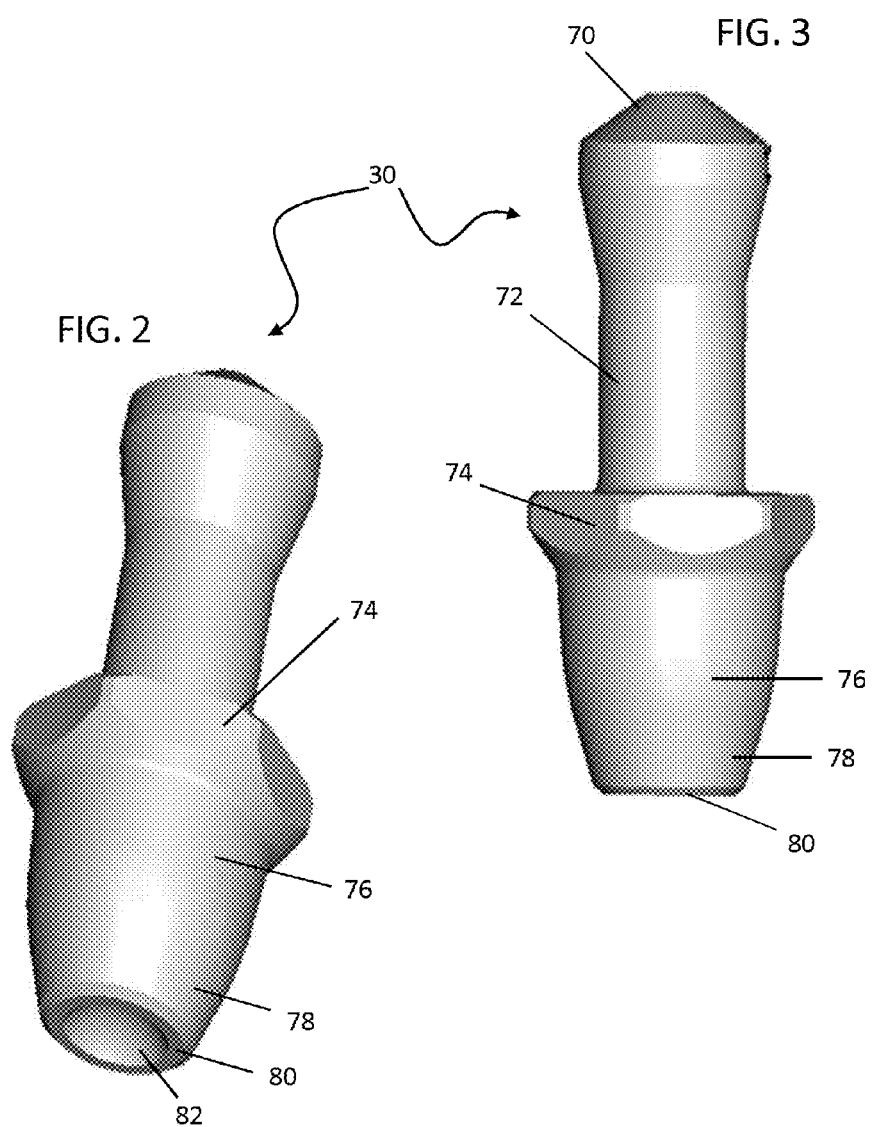

WATER MIST FIRE SUPPRESSION SPRINKLER

CROSS-REFERENCE TO RELATED APPLICATION

This application is a National Stage of International Application No. PCT/FI2013/050228 filed Mar. 1, 2013, which claims the benefit of U.S. Provisional Patent Application Ser. No. 61/606,555 filed Mar. 5, 2012, the contents of which are incorporated herein by reference thereto.

BACKGROUND OF THE INVENTION

The invention relates generally to fire suppression systems and, more particularly, to a fire suppression system having a low flow rate.

Fire suppression systems typically involve sprinklers positioned strategically within an area where fire protection is desired. The sprinklers generally remain inactive most of the time. Even though the sprinklers are inactive, many systems include a fire suppression fluid within the conduits to be supplied to the sprinklers. Because the fluid is pressurized, it is necessary to maintain an adequate seal, such as with a water seat for example, to prevent any leaks at the sprinklers while they are inactive.

The geometry of the water seat allows the orientation of the water seat to vary relative to the sprinkler housing. For example, the seal formed between the water seat and a surface of the housing will change depending on the orientation of the water seat relative to the housing when the sprinkler is activated. The orientation of the water seat may, therefore, affect the K-factor, or flow rate, of the sprinkler. Previously known sprinklers, such as those having a K-factor of 4.1 for example, have a flow rate tolerance of about ±0.2; therefore leakage of fluid from the base of the housing is not critical. However, water mist sprinklers used in some applications, such as residential applications for example, operate at substantially lower flow rates. Because the flow rate of such applications is lower, having a K-factor of around 2.4, the absolute tolerance of the flow rate for such applications is also substantially lower, about ±0.1. Consequently, the limited tolerance of the flow rate requires that no uncontrolled flow is present when the water mist sprinkler is active.

BRIEF DESCRIPTION OF THE INVENTION

According to one embodiment of the invention, a water seat for use in a fire suppression sprinkler is provided. The water seat is movable between an inactive position and an active position. The water seat includes a generally polygonal guiding surface in limited contact with the sprinkler. The water seat is slidable relative to the sprinkler when a corrosion residue is present within the sprinkler. A sealing surface is positioned adjacent the guiding surface and forms a line contact seal at an interface with the sprinkler when the water seat is in an active position. The water seat also includes a guiding portion adjacent the sealing surface and opposite the guiding surface. The combination of the guiding surface and the guiding portion maintain a generally parallel orientation of the water seat relative to the sprinkler when the water seat moves from an inactive position to an active position.

According to another aspect of the invention, a fire suppression sprinkler is provided including a housing having at least one channel for discharging a fire suppression fluid. The sprinkler also includes a water seat movable between an inactive and an active position. The water seat includes a generally polygonal guiding surface in limited contact with the sprinkler housing. The water seat is slidable relative to the housing when a corrosion residue is present within the housing. A sealing surface is disposed adjacent the polygonal guiding surface, and a guiding portion is located adjacent the sealing surface and opposite the polygonal guiding surface. When the water seat is in an active position, the water seat is in a generally parallel orientation relative to the housing and forms a line contact seal with an inside surface of the housing.

According to yet another aspect of the invention, a method for sealing an active fire suppression sprinkler is provided including breaking an activator bulb. After the activator bulb is broken, a water seat moves from an inactive to an active position when a corrosion residue is present within the sprinkler. The orientation of the water seat is maintained relative to the sprinkler, and a line contact seal is formed to prevent the fire suppression fluid of the sprinkler from leaking out a first end of the sprinkler.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a perspective view of a water seat according to an embodiment of the invention;

FIG. 3 is a side view of a water seat according to an embodiment of the invention.

DETAILED DESCRIPTION OF THE INVENTION

Figure 1:
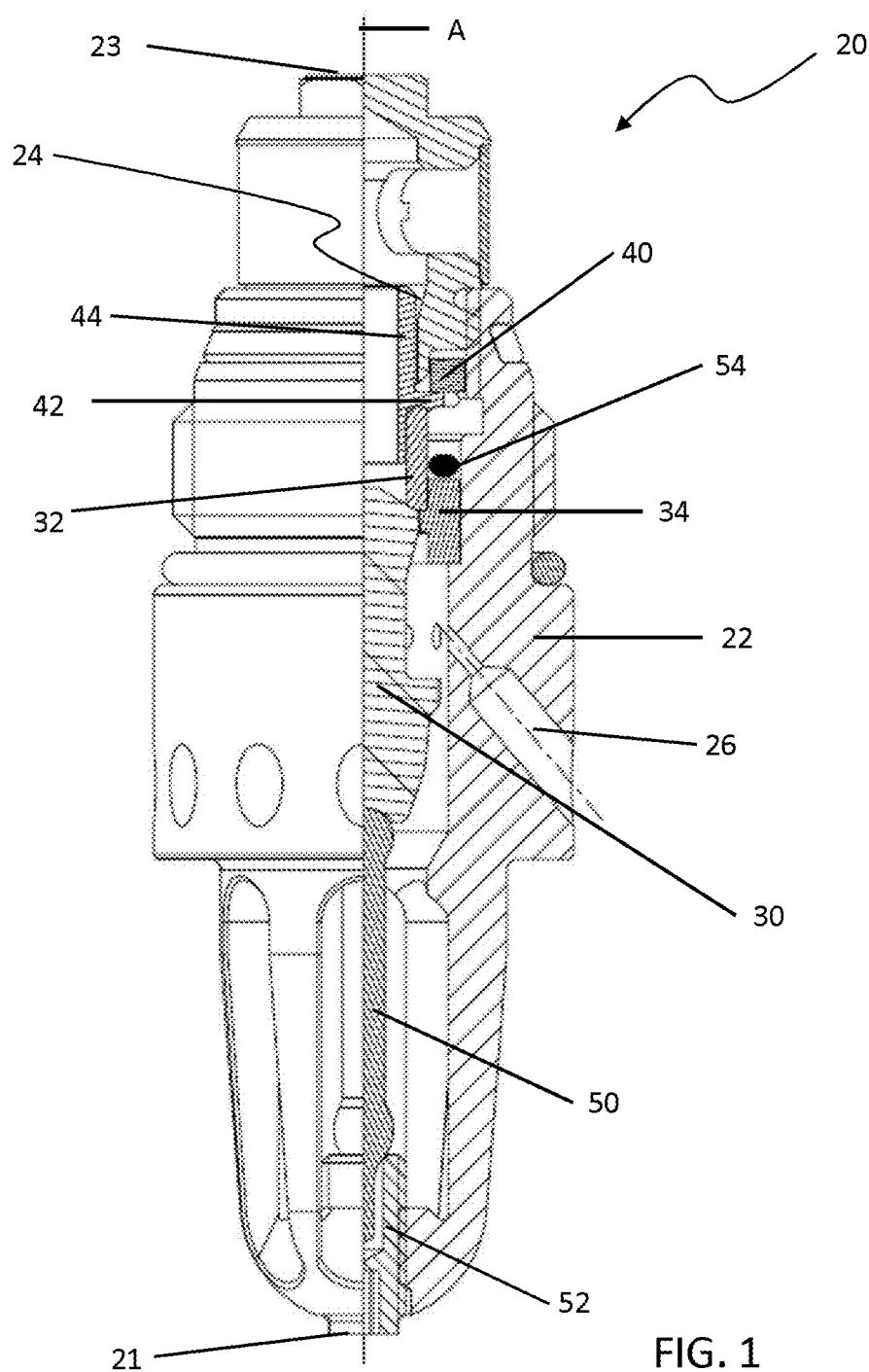
FIG. 1 is a partial-cross-sectional view of an exemplary embodiment of an inactive fire suppression sprinkler.

Referring now to FIG. 1, an exemplary fire suppression sprinkler 20 configured to discharge a mist of fire suppression fluid, such as water for example, is illustrated. The sprinkler 20 includes a housing 22 that establishes a flow path 24 through at least a portion of the housing 22. For example, the sprinkler housing 22 may include a plurality of channels 26 extending from the center of the sprinkler 20 outwards, such that the fire suppression fluid will be discharged through these channels 26 to a space outside the sprinkler 20. Disposed within the center of the sprinkler 20 is a water seat 30 movable between an inactive and an active position. When the sprinkler 20 is inactive, the water seat 30 is configured to block the flow path 24. An activator bulb 50, positioned between the water seat 30 and an adjustment member 52 located at a first end 21 sprinkler 20, retains the water seat 30 in an inactive position. The activator bulb 50 operates in a known manner for maintaining the sprinkler 20 in an inactive condition under most circumstances. Under an elevated temperature, such as in the presence of a fire for example, a fluid within the activator bulb 50 expands, causing the bulb to break, thereby allowing the sprinkler 20 to become active in a known manner.

When the water seat 30 is located in the inactive position, a seal 32 is disposed adjacent a portion of the water seat 30. The illustrated sprinkler 20 also includes a support ring 34 within the housing 22. In one embodiment, the support ring 34 is a separate piece inserted within the housing. In another embodiment, the support ring 34 is formed as part of the housing 22. The seal 32 is received between the support ring 34 and the water seat 30 to block the flow path 24 and to maintain the fire suppression fluid under pressure within the sprinkler 20 without any leaks. A spring 40 for biasing the seal 32 into engagement with the water seat 30 is positioned at a second end 23 of the sprinkler 20. An end of the spring 40 is received adjacent a rim 42 of a flow restrictor component 44. In an exemplary embodiment, the spring 40 urges the flow restrictor component 44 and the seal 32 in an axial direction, along central axis A, toward the water seat 30. The spring 40 ensures that the interface between the seal 32 and the water seat 30 provides an adequate seal to the flow path 24, regardless of whether the fluid pressure within the sprinkler 20 is sufficient to maintain the seal. The sprinkler 20 may additionally include an O-ring seal 54. Initial pressurization of the sprinkler 20 forces the O-ring seal 54 into a position adjacent the seal 32, the support ring 34, and the housing 22 to seal a fluid passage that may otherwise exist between an exterior of the seal 32 and an interior surface of the housing 22. The illustrated fire suppression sprinkler 20 is exemplary and other fire suppressions sprinklers having varying configurations are within the scope of this invention.

FIGS. 2 and 3 illustrate an exemplary water seat 30 for use in a fire suppression sprinkler 20. The water seat 30 includes a generally frustoconical top surface 70, a portion of which engages the seal 32 (FIG. 1) to block the flow of the fire suppression fluid when the water seat 30 is in an inactive position. A shaft 72 connects the top surface 70 to a generally polygonal guiding surface 74. In one embodiment, the generally polygonal guiding surface is hexagonal. In another embodiment the polygonal guiding surface is octagonal. The polygonal guiding surface 74 generally limits the non-vertical movement of the water seat 30 relative to the housing 22 (FIG. 1) of the sprinkler 20. Adjacent the surface of the guiding surface 74, opposite the shaft 72, is a generally conical sealing surface 76. When the water seat 30 moves into an active position, the conical sealing surface 76 will contact a portion of the housing 22 to prevent the fire suppression fluid from leaking through the first end 21 of the sprinkler 20. The diameter of the conical sealing surface 76 is largest adjacent the guiding surface 74, and gradually decreases along the length of the sealing surface 76.

Disposed between an end of the sealing surface 76 and the bottom surface 80 of the water seat 30 is a guiding portion 78. The guiding portion 78 is similarly conical in shape and has a larger diameter adjacent the sealing surface 76 and a smaller diameter adjacent the bottom surface 80. In one embodiment, the change in diameter along the length of the guiding portion 78 is larger than the change in diameter along the length of the sealing surface 76. The guiding portion 78 in combination with the polygonal guiding surface 74 aligns the water seat 30 with the housing 22 in a desired orientation when the water seat 30 moves to an active position. In one embodiment, a substantially shallow groove 82 extends from the bottom surface 80 into the generally conical guiding portion 78 such that a portion of the activator bulb 50 (FIG. 1) may extend into the groove 82 for retaining the water seat 30 in an inactive position.

Figure 4:
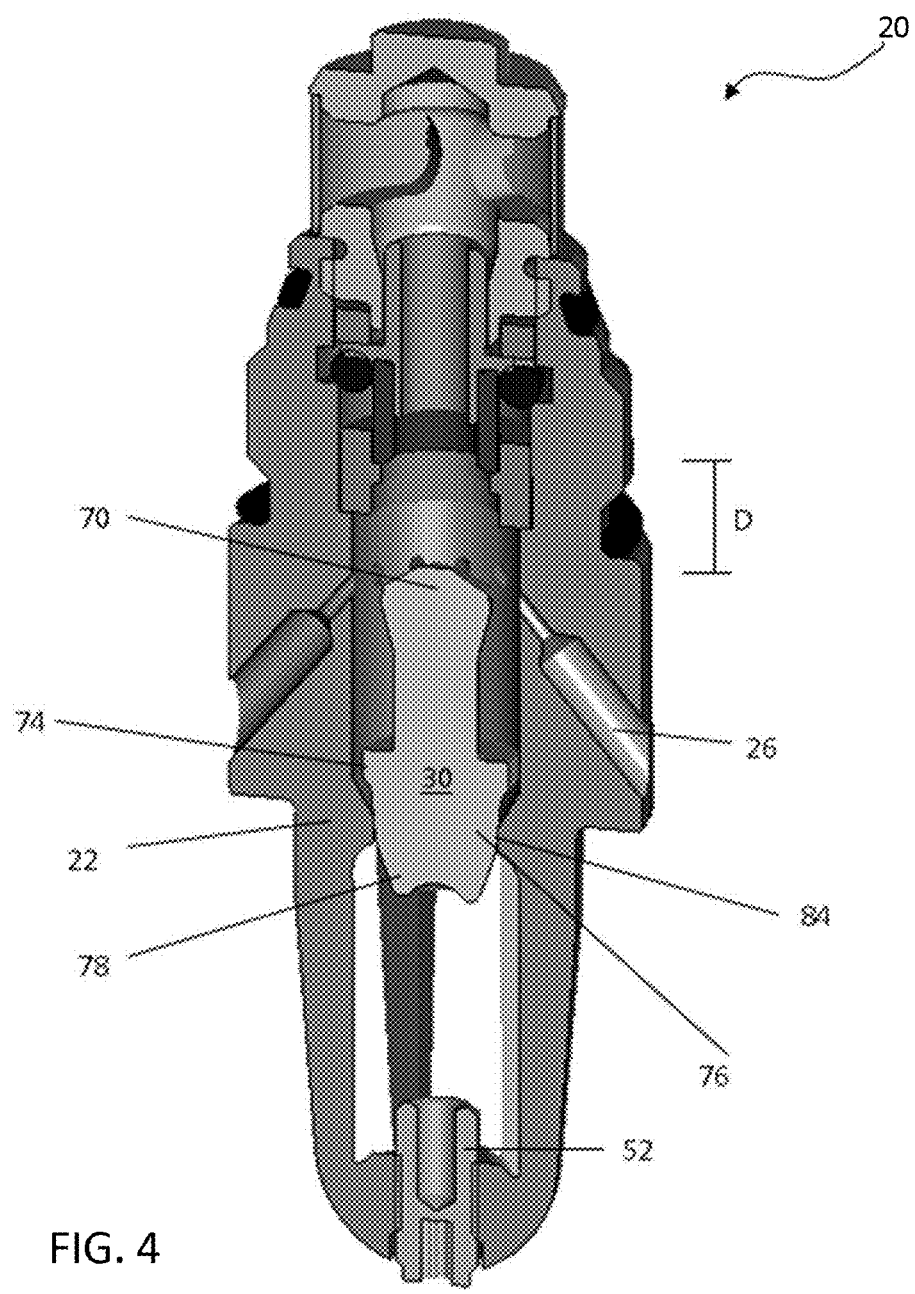
FIG. 4 is a perspective cross-sectional view illustration of an active fire suppression sprinkler.

Referring now to FIG. 4, a cross-sectional view of an active fire suppression sprinkler 20 is illustrated. After the activator bulb 50 has broken, the pressure of the fire suppression fluid will move the water seat 30 from a first inactive position (FIG. 1) to a second active position. Because the polygonal guiding surface 74 has a plurality of sides, the guiding surface 74 is in limited contact, such as point contact for example, with the housing 22 that generally occurs at the intersection of adjacent sides of the guiding surface 74. This limited contact between the guiding surface 74 and the housing 22 loosely retains the water seat 30 in a centered position within the housing 22 while the water seat 30 moves from an inactive position to an active position. In addition, this limited contact allows the water seat 30 to be easily moved within the housing 22 when the sprinkler 20 is activated, even when corrosion residue and other debris are present inside the sprinkler 20 as a result of certain environmental conditions. The guiding portion 78 of the water seat 30 ensures that the water seat 30 is substantially aligned with central axis A and the housing 22 when the water seat 30 contacts an inside surface 84 of the housing 22. As the water seat 30 moves to an active position, the pressure of the fire suppression fluid wedges the conical sealing surface 76 against the inside surface 84 of housing 22 to create a line contact seal. In one embodiment, the line contact seal is formed at a portion of the sealing surface 76 adjacent the guiding portion 78.

The geometric features of the water seat 30 create an improved fire suppression sprinkler 20. By ensuring that the water seat 30 is in a vertical position, parallel to the housing 22 when the line contact seal is formed, the efficacy of the seal is improved, and the leakage of the sprinkler 20 is thereby greatly reduced. The limited contact between the guiding surface 74 and the housing 22 permits movement of the water seat 30 even under corrosive conditions. Additionally, only a small movement of the water seat 30, generally in the range of between 0.3 mm to 1.4 mm is required to activate the sprinkler 20 and allow a flow of the fire suppression fluid.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A water seat for use in a fire suppression sprinkler movable between an inactive position and an active position comprising:
   a generally polygonal guiding surface, wherein the polygonal guiding surface is in limited contact with the sprinkler, such that the water seat slides relative to the sprinkler when a corrosion residue is present within the sprinkler;
   a sealing surface adjacent the polygonal guiding surface, wherein the sealing surface forms a line contact seal with the sprinkler when the water seat is in an active position; and
   a guiding portion adjacent the sealing surface and opposite the polygonal guiding surface, the guiding portion being generally conical in shape such that the guiding portion and the guiding surface retain the water seat in an orientation generally parallel to the sprinkler when the water seat moves from an inactive to an active position.

2. The water seat according to claim 1, wherein the polygonal guiding surface is generally hexagonal.

3. The water seat according to claim 1, wherein the sealing surface is generally conical.

4. The water seat according to claim 3, wherein a diameter of the sealing surface is largest adjacent the guiding surface and gradually decreases along the length of the sealing surface.

5. The water seat according to claim 1, wherein a diameter of the guiding portion is largest adjacent the sealing surface and gradually decreases along the length of the guiding portion.

6. The water seat according to claim 1, wherein a substantially shallow groove extends from a bottom surface of the water seat into the guiding portion.

7. A fire suppression sprinkler comprising:
a housing having at least one channel for discharging a fire suppression fluid; and
a water seat, movable between an inactive and an active position, the water seat including a generally polygonal guiding surface in limited contact with the housing, such that the water seat slides relative to the housing when a corrosion residue is present within the housing, a sealing surface adjacent the polygonal guiding surface, and a guiding portion adjacent the sealing surface and opposite the polygonal guiding surface, the guiding portion being generally conical in shape such that when the water seat is in an active position, the water seat is in a generally parallel orientation relative to the housing and forms a line contact seal with an inside surface of the housing.

8. The fire suppression sprinkler according to claim 7, wherein the polygonal guiding surface is in point contact with the housing of the sprinkler.

9. The fire suppression sprinkler according to claim 7, wherein the polygonal guiding surface and the guiding portion retain the water seat in a generally parallel orientation relative to the housing when the water seat moves from an inactive to an active position.

10. The fire suppression sprinkler according to claim 7, wherein the sealing surface forms the line contact seal with the inside surface of the housing.

11. The fire suppression sprinkler according to claim 7, wherein the guiding surface is generally hexagonal.

12. The fire suppression sprinkler according to claim 7, wherein the sealing surface is generally conical.

13. The fire suppression sprinkler according to claim 7, wherein a substantially shallow groove extends from a bottom surface of the water seat into the guiding portion such that an activator bulb may engage the shallow groove to retain the water seat in an inactive position.

14. A method for sealing an active fire suppression sprinkler comprising:
breaking an activator bulb;
moving a water seat from an inactive position to an active position when a corrosion residue is present within the sprinkler, the water seat including a generally polygonal guiding surface and a generally conical guiding portion, wherein only a portion of the polygonal guiding surface is arranged in limited contact with the sprinkler;
maintaining the orientation of the water seat relative to the sprinkler;
forming a line contact seal to prevent a fire suppression fluid from leaking from a first end of the sprinkler.

15. The method for sealing an active fire suppression sprinkler according to claim 14, wherein the orientation of the water seat is maintained by a generally hexagonal guiding surface and a generally conical guiding portion of the water seat.

16. The method for sealing an active fire suppression sprinkler according to claim 14, wherein the line contact seal is formed between a generally conical sealing surface of the water seat and an inside surface of the sprinkler.

17. The method for sealing an active fire suppression sprinkler according to claim 14, wherein the water seat moves a distance of approximately 1.2 mm from an inactive position to an active position.

* * * * *